US009592866B2

(12) United States Patent
Hasselbusch et al.

(10) Patent No.: US 9,592,866 B2
(45) Date of Patent: Mar. 14, 2017

(54) TRACK ASSEMBLY HAVING A WEAR MONITORING SYSTEM

(71) Applicant: Caterpillar Inc., Peoria, IL (US)

(72) Inventors: Michael Hasselbusch, Metamora, IL (US); Kevin L. Steiner, Tremont, IL (US); Eric James Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 44 days.

(21) Appl. No.: 14/534,649

(22) Filed: Nov. 6, 2014

(65) Prior Publication Data
US 2016/0129954 A1   May 12, 2016

(51) Int. Cl.
*G01M 17/03* (2006.01)
*B62D 55/20* (2006.01)
*G07C 5/08* (2006.01)

(52) U.S. Cl.
CPC ............. *B62D 55/20* (2013.01); *G01M 17/03* (2013.01); *G07C 5/0841* (2013.01)

(58) Field of Classification Search
CPC ...... B62D 55/20; G01M 17/03; G07C 5/0841
See application file for complete search history.

(56) References Cited

U.S. PATENT DOCUMENTS

| 3,815,426 A | 6/1974 | Rohner |
| 3,958,445 A | 5/1976 | Howard et al. |
| 4,150,584 A * | 4/1979 | Theijsmeijer ........ B65G 17/385 198/852 |
| 4,202,219 A * | 5/1980 | Weis ....................... F16G 15/00 474/223 |
| 4,790,190 A | 12/1988 | Bambara et al. |

(Continued)

FOREIGN PATENT DOCUMENTS

| EP | 2 175 423 | 4/2010 |
| EP | 2 548 665 | 1/2013 |

(Continued)

OTHER PUBLICATIONS

Zhange, Z X et al., Measurements of cutter forces and cutter temperature of boring machine in Aspo Hard Rock Laboratory, Tech. Rpt TR-01-34, Apr. 2001.

(Continued)

*Primary Examiner* — Frank Vanaman
(74) *Attorney, Agent, or Firm* — Finnegan, Henderson, Farabow, Garrett & Dunner, LLP

(57) ABSTRACT

A track assembly may have a chain assembly including a plurality of track links, a traction assembly including track shoes secured to the plurality of track links, a drive sprocket, an idler assembly including an idler and a mount, and a roller assembly including a plurality of rollers and a roller frame. A wear monitoring system may have a wear sensor configured to generate a signal indicative of a current position of a first component of the track assembly, and a controller in communication with the at least one wear sensor, the controller being configured to determine an amount of wear experienced by the track assembly based on the signal. The first component may be configured such that wear of at least a second component causes the first component to move to the current position from a previous position.

9 Claims, 3 Drawing Sheets

(56) References Cited

U.S. PATENT DOCUMENTS

| | | | |
|---|---|---|---|
| 4,928,521 A | 5/1990 | Jardine | |
| 5,348,515 A | 9/1994 | Miller | |
| 5,436,612 A | 7/1995 | Aduddell | |
| 5,636,026 A | 6/1997 | Mian et al. | |
| 5,749,635 A * | 5/1998 | Umbarger | B62D 55/20 |
| | | | 305/187 |
| 6,024,183 A | 2/2000 | Dietz et al. | |
| 6,027,185 A | 2/2000 | Crabb | |
| 6,107,917 A | 8/2000 | Carrender et al. | |
| 6,250,429 B1 | 6/2001 | Kramer | |
| 6,276,768 B1 | 8/2001 | Miller | |
| 6,305,763 B1 | 10/2001 | Oertley | |
| 6,354,678 B1 | 3/2002 | Oertley | |
| 6,360,850 B1 | 3/2002 | Odisho et al. | |
| 6,431,008 B1 | 8/2002 | Oertley et al. | |
| 6,477,893 B1 | 11/2002 | Djordjevic | |
| 6,569,046 B1 | 5/2003 | Gregg | |
| 6,682,155 B2 | 1/2004 | Hoff et al. | |
| 6,845,306 B2 | 1/2005 | Henry et al. | |
| 6,868,711 B2 | 3/2005 | Ebi | |
| 6,948,783 B2 | 9/2005 | Hoff | |
| 7,014,271 B2 | 3/2006 | Burger et al. | |
| 7,032,740 B2 | 4/2006 | Hochhaus et al. | |
| 7,172,257 B2 | 2/2007 | Tamaru et al. | |
| 7,177,553 B2 | 2/2007 | Ono | |
| 7,210,750 B2 | 5/2007 | Yamamoto et al. | |
| 7,237,631 B2 | 7/2007 | Livesay et al. | |
| 7,239,242 B2 | 7/2007 | Gosh et al. | |
| 7,374,257 B2 | 5/2008 | Oertley | |
| 7,507,965 B2 | 3/2009 | Lane et al. | |
| 7,540,374 B2 | 6/2009 | Rathbun et al. | |
| 7,698,946 B2 | 4/2010 | Clarke et al. | |
| 7,764,173 B2 | 7/2010 | Yamagiwa | |
| 7,908,928 B2 | 3/2011 | Vik et al. | |
| 7,914,086 B2 | 3/2011 | Mulligan | |
| 8,100,483 B2 | 1/2012 | Diekevers et al. | |
| 8,169,311 B1 | 5/2012 | Breed | |
| 8,326,549 B2 | 12/2012 | Ishizaki et al. | |
| 8,335,606 B2 | 12/2012 | Mian et al. | |
| 8,398,182 B2 | 3/2013 | Simula et al. | |
| 8,426,813 B2 | 4/2013 | Furry | |
| 8,540,325 B2 | 9/2013 | Diekevers et al. | |
| 8,543,283 B2 | 9/2013 | Boss et al. | |
| 8,596,126 B2 | 12/2013 | Oliver et al. | |
| 8,600,611 B2 | 12/2013 | Seize | |
| 2002/0116992 A1 | 8/2002 | Rickel | |
| 2002/0157927 A1 * | 10/2002 | Takeno | B62D 55/20 |
| | | | 198/849 |
| 2004/0068354 A1 * | 4/2004 | Tabe | B60R 22/48 |
| | | | 701/45 |
| 2006/0044146 A1 | 3/2006 | Ferguson et al. | |
| 2006/0243839 A9 | 11/2006 | Barscevicius et al. | |
| 2007/0044447 A1 | 3/2007 | Viaud | |
| 2007/0088523 A1 | 4/2007 | Keller et al. | |
| 2009/0099886 A1 | 4/2009 | Greiner et al. | |
| 2009/0297273 A1 | 12/2009 | Lindbergh et al. | |
| 2009/0313860 A1 | 12/2009 | Breiner et al. | |
| 2010/0013594 A1 | 1/2010 | Komine et al. | |
| 2010/0052418 A1 * | 3/2010 | Angot | B62D 55/135 |
| | | | 305/202 |
| 2011/0046857 A1 | 2/2011 | Farmer et al. | |
| 2012/0043980 A1 | 2/2012 | Davies | |
| 2013/0082846 A1 | 4/2013 | McKinley et al. | |
| 2013/0255354 A1 | 10/2013 | Hawkins et al. | |
| 2014/0105481 A1 | 4/2014 | Hasselbusch et al. | |
| 2014/0229120 A1 | 8/2014 | Luharuka et al. | |
| 2016/0131544 A1 | 5/2016 | Rust | |

FOREIGN PATENT DOCUMENTS

| | | |
|---|---|---|
| JP | 2000-042894 | 2/2000 |
| KR | 101087961 | 5/2011 |
| WO | WO 99/51996 | 10/1999 |
| WO | WO 2006/116758 | 11/2006 |
| WO | WO 2010/117331 | 10/2010 |
| WO | WO 2013/057275 | 4/2013 |
| WO | WO 2014/000507 | 1/2014 |

OTHER PUBLICATIONS

Behmlander, Matthew J., et al., "Erosion Monitoring System for Ground Engaging Tool," U.S. Appl. No. 13/866,394, filed Apr. 19, 2013.

De Broissia, M. et al, "Global Optimisation of Disc Cutter Tool Life for Tunnel Boring Machine Preparing 4th Eurothen Workshop" *Bougues Travaux Publics.*

EPO International Search Report, PCT/US2006/016518, filing date Oct. 30, 2006.

EPO International Search Report, PCT/US2012/057831, filing date Sep. 28, 2012.

McKinley, Timothy Allen, et al., "Sensor System and Method," U.S. Appl. No. 13/628,662, filed Sep. 27, 2012.

Shanahan, A. Cutter Instrumentation System for Tunnel boring Machines, *The Robbins Co.*, Kent, WA available Sep. 17, 2010.

McKinley, Timothy Allen, et al., "Track Link Having a Wear Sensing Device," U.S. Appl. No. 14/466,982, filed Aug. 23, 2014.

* cited by examiner

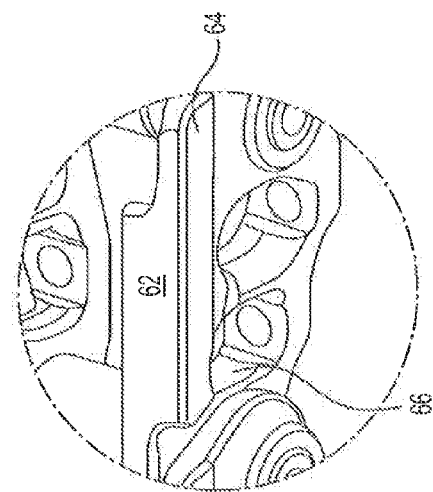
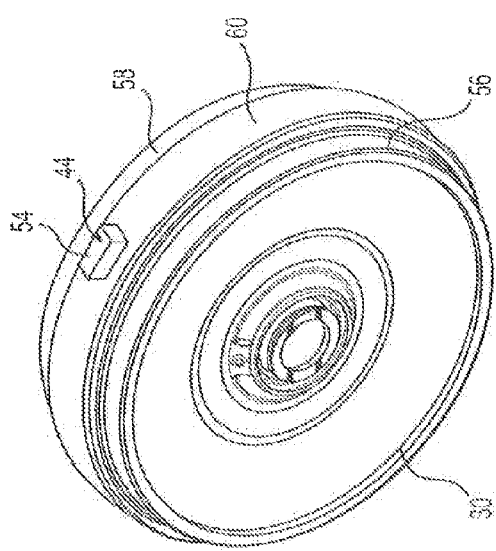
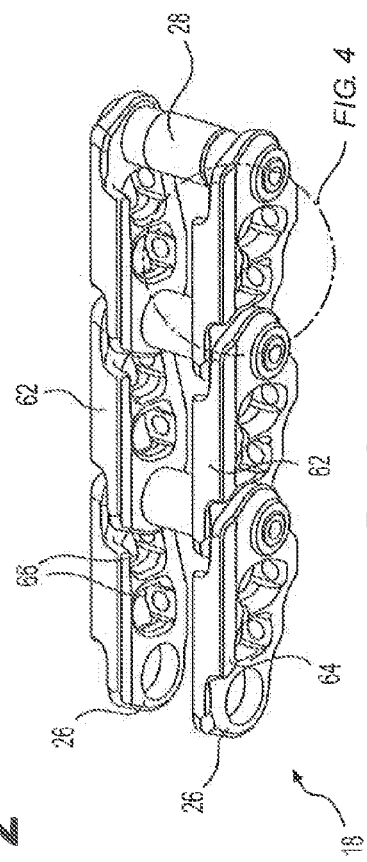
FIG. 2
FIG. 3
FIG. 4

TRACK ASSEMBLY HAVING A WEAR MONITORING SYSTEM

TECHNICAL FIELD

The present disclosure is directed to a track assembly and, more particularly, to a track assembly having a wear monitoring system.

BACKGROUND

A mobile machine may be used to perform various types of work on different worksites, such as a construction site, a demolition site, a mining site, or a landfill site. For example, a bulldozer may be used to push soil and rock on a construction site. The bulldozer, as a track-type mobile machine, includes a tracked undercarriage with tracks on the left and right sides of the machine. Each of the tracks includes a chain formed by connecting a number of track links to one another, and connecting a number of track shoes to the chains. The tracks are supported and guided in movement by various driver, idler, and/or roller assemblies on both sides of the machine.

Operation of the mobile machine inevitably results in wear or damage to various components, including components of the undercarriage such as the track links, idler, and roller assemblies. For example, as a track assembly operates, a surface of each track link may wear away through contact with other components of the track assembly, machine, and/or outside materials (e.g., the ground). When a component experiences a certain amount of wear, the component has exceeded its usable lifetime and should be replaced. When the undercarriage as a whole experiences a certain amount of wear, an overhaul of the undercarriage may be necessary.

It is known to service or replace an undercarriage component, for example, when the component exceeds its expected lifetime (based on the age of the component or number of hours of use experienced by the component), or based on the results of inspection or evaluation of the component. However, these known methods for determining when components are to be serviced or replaced suffer from numerous disadvantages. For example, a particular machine component may be capable of being used far in excess of its expected lifetime, and thus replacement of the component based solely on age may be premature and result in unnecessary costs and machine down-time. Conversely, a particular machine component may fail well in advance of its expected lifetime, and continued operation of the machine with the damaged component may result in damage to other components of the machine. Similarly, inspection and evaluation of a machine component may result in unnecessary costs and machine down-time when it is determined that service or replacement of the component is not required.

The present disclosure is directed to overcoming one or more of the problems set forth above and/or other problems of the prior art.

SUMMARY

In one aspect, the present disclosure is directed to a track assembly for a mobile machine. The track assembly may include a chain assembly including a plurality of track links, a traction assembly including a plurality of track shoes secured to the plurality of track links, a drive sprocket, an idler assembly including an idler and a mount, and a roller assembly including a plurality of rollers and a roller frame. The track assembly may also include a wear monitoring system. The wear monitoring system may include a wear sensor configured to generate a signal indicative of a current position of a first component of the track assembly, and a controller in communication with the at least one wear sensor, the controller being configured to determine an amount of wear experienced by the track assembly based on the signal. The first component may be configured such that wear of at least a second component causes the first component to move to the current position from a previous position.

In another aspect, the present disclosure is directed to a method of monitoring wear of a track assembly including a track link, a track shoe, a drive sprocket, an idler, and a roller. The method may include detecting a current position of a first component of the track assembly, and determining a combined amount of wear of the track link and at least one of the drive sprocket, the idler, and the roller, based on the current position of the first component. The first component may be configured such the combined amount of wear causes the first component to move to the current position from a previous position.

In yet another aspect, the present disclosure is directed to a track assembly for a mobile machine. The track assembly may include a chain assembly including a plurality of track links, a traction assembly including a plurality of track shoes secured to the plurality of track links, a drive sprocket, an idler assembly including an idler and a mount, and a roller assembly including a plurality of rollers and a roller frame. The track assembly may further include a wear monitoring system. The wear monitoring system may include at least two wear sensors, each configured to generate a signal indicative of a current position of a component of the track assembly, and a controller in communication with the at least two wear sensors, the controller being configured to determine an amount of wear experienced by the track assembly based on the signals. The component may be configured such that wear of at least another component of the track assembly causes the component to move to the current position from a previous position. In addition, each of the at least two wear sensors may be one of a camera sensor, a detection sensor, or a distance sensor.

BRIEF DESCRIPTION OF THE DRAWINGS

FIG. 2 illustrates an exemplary idler of the track assembly of FIG. 1 and a wear sensor that may be used in conjunction with the wear monitoring system of FIG. 1;

FIG. 3 illustrates a portion of an exemplary chain assembly of the track assembly of FIG. 1;

FIG. 4 illustrates a portion of the chain assembly of FIG. 3 in more detail;

DETAILED DESCRIPTION

Figure 1:
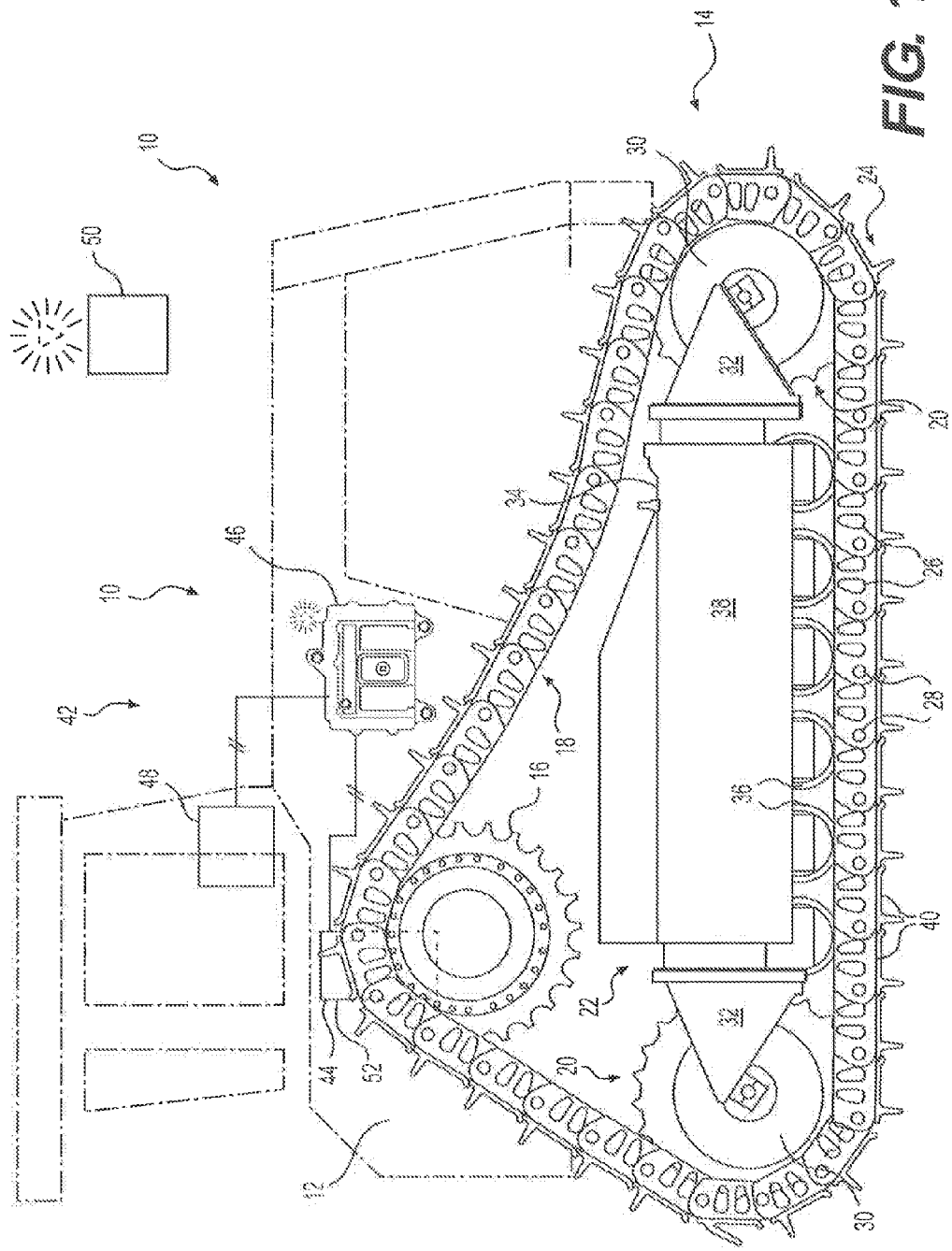
FIG. 1 illustrates a mobile machine having a track assembly and a wear monitoring system for the track assembly.

FIG. 1 illustrates an exemplary track-type machine 10, consistent with disclosed embodiments. Track-type machine 10 may embody any machine that is driven, propelled, positioned, and/or maneuvered by operating a "continuous"

track-type traction device. Such machines may include, for example, track-type tractors, skid steers, dozers, excavators, backhoes, track loaders, front shovels, rope shovels, or any other type of track-maneuverable machine. Machine 10 may include a frame 12 and a pair of track assemblies 14 (only one shown) secured to frame 12 on opposing sides of machine 10. Track assembly 14 may include a drive sprocket 16 coupled to a driving mechanism (not shown), and a chain assembly 18 operatively coupled to the driving mechanism by drive sprocket 16 and configured to propel machine 10.

The driving mechanism may include one or more components configured to generate a torque output. For example, the driving mechanism may include any suitable type of internal combustion engine, such as a gasoline, diesel, natural gas, or hybrid-powered engine or turbine. Alternatively or additionally, the driving mechanism may embody an electric motor, electrically coupled to an electric power source and configured to convert at least a portion of the electrical energy from the electric power output into mechanical energy. According to yet another embodiment, the driving mechanism may include a hydraulic motor fluidly coupled to a hydraulic pump and configured to convert a fluid pressurized by the pump into a torque output.

Drive sprocket 16 may be coupled to the driving mechanism via a shaft, which may provide an interface for delivering torque generated by the driving mechanism to drive sprocket 16. For example, drive sprocket 16 may be secured (e.g., welded, bolted, heat-coupled, etc.) to a hub associated with a shaft, so that drive sprocket 16 rotates in response to the torque generated by the driving mechanism. In some embodiments, drive sprocket 16 may be directly coupled via a drive shaft to the driving mechanism. Alternatively, drive sprocket 16 may be coupled to the driving mechanism via a torque converter (such as a gearbox, transmission, etc.), so that rotation of drive sprocket 16 is proportional to the torque generated by the driving mechanism.

Track assembly 14 may include a plurality of components that form the "continuous" track, ground-engaging portion of the drive system of machine 10. Track assembly 14 may include, among other things, drive sprocket 16, chain assembly 18, at least one idler assembly 20, a roller assembly 22, and a traction assembly 24. However, it should be understood that these components of track assembly 14 are exemplary only and not intended to be limiting. Accordingly, track assembly 14 may include additional and/or different components than those listed above.

Chain assembly 18 may form a continuous chain connected around outer portions of drive sprocket 16, idler assemblies 20, and roller assembly 22. Traction assembly 24 may be connected to an outer portion of chain assembly 18 and configured to engage a ground surface beneath track-type machine 10. In use, rotation of drive sprocket 16 may cause chain assembly 18 to move around drive sprocket 16, idler assemblies 20, and roller assembly 22, causing traction assembly 24 to engage the ground and thereby propel track-type machine 10 in a manner known in the art.

In an exemplary embodiment, chain assembly 18 may include a plurality of interconnected track links 26. It should be understood that "track link," as used herein, refers to any linkage component of a continuous chain for a track-type machine, and is not limited to track links 26 described herein. In one embodiment, adjacent (e.g., consecutive) track links 26 may be coupled together via a plurality of track pin assemblies 28. In an exemplary embodiment, chain assembly 18 may include two parallel sets of track links, connected to each other by track pin assemblies 28 (shown in FIG. 3).

Idler assemblies 20 may include components configured to guide chain assembly 18 as it moves around track assembly 14. For example, each idler assembly 20 may include an idler 30 and a mount 32. Idlers 30 may include features configured to engage chain assembly 18. For example, idlers 30 may include engagement surfaces configured to contact and guide track links 26 as they pass around idler 30. In some embodiments (such as idler 30 shown in FIG. 1), idler 30 may include idler teeth (e.g., between the engagement surfaces) configured to engage track pin assemblies 28. In other embodiments, the engagement surfaces may be separated by a flange.

Each mount 32 may hold idler 30 in place on machine 10 through connection to frame 12. In an exemplary embodiment, an adjustment mechanism 34 may be connected to at least one mount 32, such as to adjust a position of an associated idler 30 (e.g., extend one idler 30 away from another idler 30). Adjusting the position of idler 30 may increase or decrease the tension of chain assembly 18.

Roller assembly 22 may also include components configured to guide chain assembly 18. For example, roller assembly 22 may include a plurality of rollers 36 and a roller frame 38. Roller frame 38 may be mounted to frame 12 of machine 10. Rollers 36 may guide chain assembly 18 at a lower side of roller frame 38. Rollers 36 may each be suspended from roller frame 38. For example, each of rollers 36 may be rotationally supported on an axle suspended below roller frame 38. Rollers 36 may ride on and guide track links 26 as they pass under roller frame 38.

Traction assembly 24 may include a plurality of track shoes 40 carried by chain assembly 18. In some embodiment, track shoes 40 may be separate from chain assembly 18 and include a connecting portion configured to be secured to one or more track links 26 and a ground engaging portion configured to contact the ground. In other embodiments, individual track shoes 40 and track links 26 may be integrally formed as one piece. The ground engaging portion may include one or more features (e.g., grouser bars) that provide increased traction between track shoes 40 and the ground. It should be understood, however, that the disclosed embodiments may be used with any type of track shoe forming a part of a track assembly used by a track-type mobile machine. In other embodiments, track shoes 40 may be omitted entirely from track assembly 14, so that surfaces of track links 26 that would otherwise contact track shoes 40 may contact the ground surface under machine 10.

As machine 10 operates, the components of track assembly 14 will experience wear. For example, metal-on-metal contact between adjacent components of track assembly 14 may cause material at the contacting surfaces to wear away, reducing the size of the component. For instance, contact between track links 26 and engagement surfaces of idlers 30 and rollers 36 and between track pin assemblies 28 and gear teeth of drive sprocket 16 (and idlers 30, if so configured) may wear away material at the contacting surfaces. Contact with abrasive debris may also cause wear to these components. The wear may cause a reduction in size of track links 26 (e.g., a height of each track link 26 may decrease) and/or of idlers 30, rollers 36, and drive sprocket 16 (e.g., associated radii may decrease).

Machine 10 may include a monitoring system 42 configured to monitor track assembly 14, determine one or more parameters associated with wear of track assembly 14, and provide the one or more parameters to another component and/or a user. In an exemplary embodiment, monitoring system 42 may include at least one wear sensor 44, a controller 46, an on-board computer 48, and an off-board computer 50.

Wear sensor 44 may be configured to generate a signal indicative of a wear parameter associated with track assembly 14. A wear parameter may be any parameter which changes over time, and in which the change substantially correlates with an amount of wear experienced by track assembly 14 over that period of time. In an exemplary embodiment, a wear parameter may be a current position of a component with respect to wear sensor 44 and/or another component of track assembly 14. As used herein, a current position may refer to a position of a component at a time the position is detected. In another example, a wear parameter may be a dimension of a component that wears.

In an exemplary embodiment, wear sensor 44 may be mounted to one component of track assembly 14 and configured to generate a signal indicative of a wear parameter associated with another component of track assembly 14. For example, wear sensor 44 may be mounted to a component of track assembly 14 that does not substantially wear during normal use of machine 10 and measure a wear parameter associated with a component of track assembly 14 that does wear during normal use of machine 10. Several embodiments of wear sensor 44, which may be used separately or in conjunction with each other, are disclosed herein and are described in more detail below.

Controller 46 may embody a single microprocessor or multiple microprocessors that include a means for controlling an operation of monitoring system 42. Numerous commercially available microprocessors can be configured to perform the functions of controller 46. It should be appreciated that controller 46 could readily be, at least in part, an electronic control module (ECM) of machine 10. Controller 46 may include a memory, a secondary storage device, a processor, and any other components for running an application. Various other circuits may be associated with controller 46 such as power supply circuitry, signal conditioning circuitry, solenoid driver circuitry, and other types of circuitry.

One or more maps relating the signals from wear sensor(s) 44 with wear values for components of track assembly 14 may be stored in the memory of controller 46. Each of these maps may include a collection of data in the form of tables, graphs, and/or equations. As will be described in more detail below, controller 46 may be configured to select specific maps from available relationship maps stored in the memory of controller 46 to automatically determine and/or accommodate component wear.

In an exemplary embodiment, controller 46 may be configured to determine an amount of wear experienced by track assembly 14 based on signals from wear sensor(s) 44. In one embodiment, controller 46 may be configured to determine a combined amount of wear experienced by chain assembly 18 and at least one of drive sprocket 16, idlers 30, and rollers 36, depending on the configuration of wear sensor(s) 44. For example, in one embodiment, controller 46 may be configured to determine a combined wear experienced by track links 26 and idler 30. That is, controller 46 may determine an approximate total amount of wear experienced by an individual track link 26 (which may be assumed to be the same or similar across all track links 26) and idler 30 as a single amount. It should be understood, however, that controller 46 may use various tools (e.g., wear tables, algorithms, etc.) to determine an approximate amount of wear experienced by individual components (e.g., each track link 26, idler 30) based on the combined wear determination.

On-board computer 48 may be a computing device located on machine 10 (e.g., inside an operator cabin). For example, on-board computer 48 may be a dashboard computer including at least a processor and a display. On-board computer 48 may communicate with controller 46 (e.g., via a wired or wireless connection) to receive wear information collected by wear sensor(s) 44. In an exemplary embodiment, on-board computer 48 may display wear information (e.g., to an operator of machine 10). Wear information may include, for example, safety messages regarding the state of track assembly 14, an estimated operating time left until service will be necessary, etc.

Off-board computer 50 may be a similar computing device located away from machine 10 (e.g., inside a control building). Off-board computer 50 may also include at least a processor and a display. Off-board computer 50 may be configured to wirelessly communicate with controller 46 and/or on-board computer 48 to similarly receive wear information, which may be displayed to an operator (e.g., a machine supervisor) away from machine 10. The wireless communication may include satellite, cellular, infrared, and any other type of wireless communication. Wear information may include messages regarding wear parameters, identification of worn undercarriage components, and/or instructions for the service personnel. In one example, the wear information may be used to direct service personnel to provide quotes for replacement undercarriage components to the owner of machine 10 and/or to schedule service of machine 10 with the owner.

FIGS. 1-6 illustrate various embodiments of wear sensor 44 for measuring a wear parameter associated with one or more components of track assembly 14. These embodiments are exemplary and should not be considered limiting. In some embodiments, a wear sensor 44 may be used individually (e.g., one wear sensor 44 per track assembly 14). In other embodiments, two or more wear sensors 44 may be used in conjunction with each other to measure the same or different wear parameters.

FIG. 1 depicts a camera sensor 52. Camera sensor 52 may be configured to capture images of at least one component of track assembly 14. In an exemplary embodiment, camera sensor 52 may be configured to capture images of at least a portion of drive sprocket 16 and at least a portion of chain assembly 18. For example, camera sensor 52 may be mounted to frame 12 of machine 10 and configured to capture images of drive sprocket 16, at least one track link 26, and at least one track shoe 40. As drive sprocket 16 and track links 26 wear, a radius of drive sprocket 16 and a height of track links 26 will reduce. This may cause track shoes 40 to move closer to a center of drive sprocket 16 over time. Camera sensor 52 may be configured to capture images of these components over time, and transmit signals to controller 46, which may include the captured images as image data.

Controller 46 may be configured to analyze the captured images to determine an amount of wear experienced by track assembly 14. For example, controller 46 may compare positions of a track shoe 40 with respect to drive sprocket 16 over time. Based on the comparison, controller 46 may determine an amount of wear that has occurred during the corresponding period of time (e.g., the amount of wear that would cause the determined change in position). In another example, controller 46 may be configured to analyze the images to determine a change in a dimension of a component, such as a radius of drive sprocket 16 and/or a height of a track link 26.

It should be understood that the depicted positioning of camera sensor 52 is exemplary, and that alternative or additional configurations of camera sensor 52 may be implemented. For example, a camera sensor 52 may be mounted to frame 12 in a position to similarly capture images of an idler 30 and chain assembly 18. In other embodiments, camera sensor 52 may be mounted to another component of machine 10, such as a mount 32, adjustment mechanism 34, or roller frame 38.

FIGS. 2-4 further illustrate components of track assembly 14 and another embodiment of a wear sensor 44. For example, FIG. 2 depicts an idler 30 and a detection sensor 54. Idler 30 may be configured to be secured to a mount 32 for connection to frame 12 of machine 10. Idler 30 may include a first rail 56, a second rail 58, and a center flange 60.

FIGS. 3-4 depict a portion of chain assembly 18. Chain assembly 18 includes a plurality of track links 26 interconnected by track pin assemblies 28. Each track link 26 may include an engagement surface 62, an adjacent side wall 64, and at least one link window 66. Track links 26 are arranged such that aligned engagement surfaces 62 form parallel tracks separated by track pin assemblies 28. The parallel tracks formed by engagement surfaces 62 contact first and second rails 56, 58, respectively as each associated track link 26 passes around idler 30. The contact between first and second rails 56, 58 and engagement surfaces 62 may cause track links 26 and idler 30 to wear at the contacted surfaces.

Center flange 60, which is located between first and second rails 56, 58, does not experience significant wear, since chain assembly 18 does not come into contact with center flange 60 during normal operation. Instead, track pin assemblies 28 pass above center flange 60 as chain assembly 18 travels around idler 30. However, after idler 30 and track links 26 wear, engagement surfaces 62 will contact first and second rails 56, 58 at a location that is closer to a center of idler 30 than before the wear occurred. This will also cause track links 26 to move inward with respect to center flange 60.

Detection sensor 54 may be configured to generate a signal indicative of a current position of track links 26 with respect to idler 30. For example, detection sensor 54 may include a position sensor configured to direct a beam (e.g., a laser) from center flange 60 toward a track link 26, such as to side wall 64. Detection sensor 54 may be configured to generate a signal that indicates that track link 26 interrupted the path of the beam (e.g., by the beam hitting side wall 64). As track link 26 and idler 30 wear, however, side wall 64 will move inward with respect to center flange 60, and thus, detection sensor 54. After a certain amount of wear, side wall 64 will pass entirely beneath the beam of detection sensor 54, and the beam will instead pass through a link window 66 formed in track link 26. In this situation, detection sensor 54 may be configured to generate a signal that indicates that track link 26 did not interrupt the path of the beam. In this way, detection sensor 54 may be configured to generate a signal indicative of an amount of wear experienced by track assembly 14, based on the amount of wear required to move link windows 66 into alignment with a beam of detection sensor 54.

In some embodiments, one detection sensor 54 may be used. The one detection sensor 54 may be calibrated such that a beam is directed through link window 66 at a desired percentage wear (where 0% wear indicates no wear has occurred and 100% wear indicates that the track assembly 14 requires an overhaul, for example). In other embodiments, a plurality of detection sensors 54 may be used, each positioned to direct a beam at a different height above center flange 60, such that corresponding beams are directed through link window 66 at predetermined wear thresholds. For example, a first detection sensor 54 may be arranged such that its associated beam travels through a link window 66 at approximately 25% wear, a second detection sensor 54 arranged for similar detection at approximately 50% wear, a third detection sensor 54 for detecting approximately 75% wear, and a fourth detection sensor 54 for detecting approximately 100% wear. It should be understood, however, that other configurations are possible. Further, while the described embodiment includes directing a beam through a link window 66 to determine an amount of wear, it should be understood that other features of track links 26 may be configured to come into alignment with a beam of a detection sensor 54 as an indicator of a certain amount of wear.

The one or more detection sensors 54 may be configured to generate a signal indicating that track links 26 have moved toward a center of idler 30 by a threshold amount. The one or more detection sensors 54 may transmit the signals to controller 46. Controller 46 may determine the amount of wear that track assembly 14 has experienced based on the signals (e.g., by determining which detection sensor 54 has detected a threshold change). Controller 46 may transmit the wear information to one or more of on-board computer 48 and off-board computer 50.

While detection sensor 54 has been described as a position sensor that includes a beam, it should be understood that detection sensor 54 may be any sensor that may be used to determine a position of track link 26 with respect to idler 30 such that an approximate amount of wear that has occurred may be determined. For example, detection sensor 54 may be a camera sensor, a radar sensor, a Lidar sensor, an ultrasonic sensor, etc.

Figure 5:
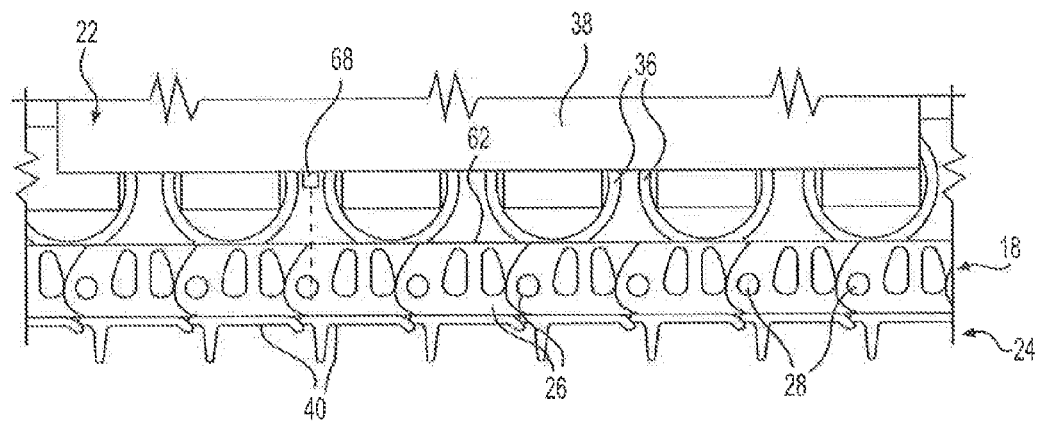
FIG. 5 illustrates a portion of the track assembly of FIG. 1 and another wear sensor that may be used in conjunction with the wear monitoring system of FIG. 1.

FIG. 5 depicts a portion of track assembly 14, including another embodiment of wear sensor 44. For example, FIG. 5 depicts a distance sensor 68. Distance sensor 68 may be configured to measure a distance between two components of track assembly 14 to determine relative positions of the components. For example, distance sensor 68 may be configured to measure a distance between a component that does not move due to wear of track assembly 14 and a component that does move due to wear of track assembly 14, to approximate an amount of wear to track assembly 14 that has occurred (e.g., based on an amount of wear that would cause the component that does move due to wear to move the measured distance).

In the illustrated embodiment, distance sensor 68 may be mounted to roller frame 38 and configured to measure a distance between roller frame 38 and traction assembly 24. As chain assembly 18 passes under rollers 36, engagement surfaces 62 (shown in FIG. 3) may wear through metal-on-metal contact with rollers 36. Corresponding surfaces of rollers 36 may also wear. As wear occurs, track links 26 move closer to the center of rollers 36 (which can also be considered rollers 36 moving closer to track links 26). As a consequence, track shoes 40 also move closer to roller frame 38. In an exemplary embodiment, distance sensor 68 may measure a distance between a lower portion of roller frame 38 and a track shoe 40 that is beneath roller frame 38 (e.g., directly beneath roller frame 38).

Distance sensor 68 may generate a signal indicative of a distance between roller frame 38 and traction assembly 24. Distance sensor 68 may transmit the signal to controller 46.

Controller 46 may determine an amount of wear based on the distance and/or transmit the wear information to on-board computer 48 and/or off-board computer 50. For example, controller 46 may use a control map, lookup table, etc., to determine an amount of wear based on a measured distance.

Figure 6:
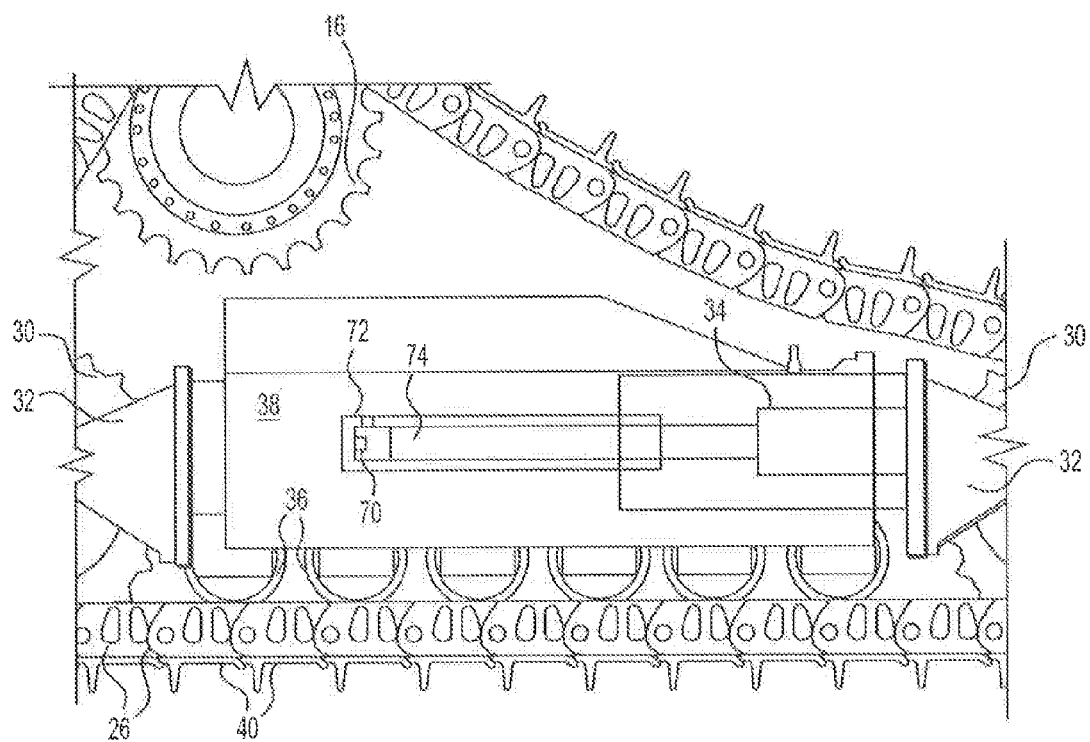
FIG. 6 illustrates another portion of the track assembly of FIG. 1 and yet another wear sensor that may be used in conjunction with the wear monitoring system of FIG. 1.

FIG. 6 depicts another embodiment of wear sensor 44, which may be associated with adjustment mechanism 34. For example, FIG. 6 depicts another distance sensor 70. Distance sensor 70 may measure a distance associated with a position of idler 30, which may be changed by adjustment mechanism 34 and relate to an amount of wear track assembly 14 has experienced.

As track assembly 14 wears, an internal circumferential length of chain assembly 18 increases, and a perimeter trajectory around drive sprocket 16, idlers 30, and rollers 36 decreases. This may result in sagging of chain assembly 18 at locations between drive sprocket 16 and an idler 30. In order to account for the sagging, adjustment mechanism 34 may be operated to increase the distance between idlers 30, increasing the perimeter trajectory around drive sprocket 16, idlers 30, and rollers 36 to substantially match the internal circumferential length of chain assembly 18, thereby maintaining a desired tension. Distance sensor 70 may determine a distance associated with adjustment of idler 30, and generate a signal indicative of this distance. Controller 46 may use this distance to determine an amount of wear that correlates with the amount idler 30 has been adjusted to compensate for wear.

In an exemplary embodiment, adjustment mechanism 34 may include a cylinder 72 and a rod 74 movable within cylinder 72, among other components. Rod 74 may be connected at one end to a mount 32 such that movement of rod 74 in cylinder 72 results in movement of an idler 30. In one example, distance sensor 70 may be a potentiometer positioned in cylinder 72. The potentiometer may generate a signal indicative of a distance between a stationary end of cylinder 72 and an end of rod 74. After tension of chain assembly 18 is lost due to wear, adjustment mechanism 34 may be automatically or manually adjusted to move rod 74 within cylinder 72 to extend idler 30 and increase the tension of chain assembly 18 back to a desired level. For example, an operator may inject a material (e.g., grease) into cylinder 72 to move rod 74.

Controller 46 may receive a signal generated by distance sensor 70 to determine an amount that idler 30 has been adjusted. Controller 46 may use a control map, lookup table, etc. to determine an amount of wear that corresponds to the distance measured by distance sensor 70. Controller 46 may transmit the wear information to on-board computer 48 and/or off-board computer 50.

While a potentiometer inside cylinder 72 is described, it should be understood that distance sensor 70 may be any sensor configured to generate a signal indicative of a position of idler 30 with respect to another component of track assembly 14 (e.g., a stationary portion of adjustment mechanism 34). For example, distance sensor 70 may be a linear actuator, Radar sensor, Lidar sensor, ultrasonic sensor, etc.

FIGS. 1-6 and the above descriptions depict and describe various embodiments of wear sensor 44. It should be understood that wear sensor 44 may be configured in accordance with any or all of these embodiments, which may be combined or used separately. The resulting one or more wear sensors 44 may generate a signal indicative of a current position of a component of track assembly 14 with respect to another component of track assembly 14. As this position changes due to wear of one or more components of track assembly 14, the one or more wear sensors 44 may generate signals indicative of the change. In an exemplary embodiment, the one or more wear sensors 44 may generate signals indicative of a position of one component of track assembly 14, which may have moved from a previous position because of another component of track assembly 14 experiencing wear. Controller 46 may operate in conjunction with on-board computer 48 and/or off-board computer 50 to determine an amount of wear associated with the change in position of the component based on the generated signal and display and/or alert an operator of the amount of wear.

INDUSTRIAL APPLICABILITY

The wear monitoring system of the present disclosure may be applicable to any track-type mobile machine. The disclosed wear monitoring system may provide a way to automatically monitor wear of undercarriage components and alert service personnel when the wear becomes excessive. Further, the use of a wear sensor to detect positions of track assembly components may be an efficient means to determine track wear. Operation of monitoring system 42 will now be described in detail.

As machine 10 operates, chain assembly 18 passes around drive sprocket 16, idlers 30, and rollers 36, causing traction assembly 24 to engage the ground and propel machine 10. As described herein, operation of machine 10 will cause at least some components of track assembly 14 to wear, thereby reducing the size of these components. The reduction in size of these components will cause some components to shift in position relative to other components. For example, as radii of first and second rails 56, 58 of idlers 30 and heights of track links 26 wear down, track links 26 will shift in position closer to the center of idlers 30. That is, engagement surfaces 62 will contact first and second rails 56, 58 at a different location than prior to the wear occurring. Similarly, track links 26 will move closer to the centers of rollers 36 and drive sprocket 16. Monitoring system 42 may include components configured to detect these positional shifts and determine an approximate amount of wear that caused them.

During operation, wear sensor 44 may generate a signal indicative of a wear parameter, and transmit the signal to controller 46. The wear parameter may be associated with a measured or detected position of a component of track assembly 14 with respect to another component. Controller 46 may analyze the measured or detected position to determine an amount of wear that would have caused it.

For example, camera sensor 52 may capture images of multiple components, such as drive sprocket 16, at least one track link 26, and at least one track shoe 40. Controller 46 may analyze the capture images to determine an amount of wear that would cause the positional relationship of the components present in the images. For example, controller 46 may compare the positional relationship present of the components in the images to one or more stored positional relationship that correspond to known amounts of wear (e.g., 0% wear, 100% wear, etc.). In another example, controller 46 may analyze the position of a component by measuring a dimension of the component, and determine an amount of wear based on a lookup table that correlates the dimension with percentage wear, for example.

In another example, detection sensor 54 may detect a position of a component over time and generate a signal indicative of that component reaching a threshold position. For example, detection sensor 54 may detect that a track links 26, passing around idler 30, have shifted far enough relative to center flange 60 such that a beam is directed through a link window 66 instead of being interrupted by side wall 64. In this way, controller 46 may determine that a threshold amount of wear has occurred (such as the amount that would cause the detected threshold shift in position). Controller 46 may inform a user that the threshold amount of wear was detected, such as via communication with on-board computer 48 and/or off-board computer 50.

Distance sensors 68, 70 may similarly measure a positional relationship of components of track assembly 14 and transmit a corresponding signal to controller 46. For example, distance sensors 68, 70 may measure a distance between a component that remains stationary even after track assembly 14 wears (e.g., roller frame 38 and cylinder 72) and a component that experiences the positional shifting caused by wear described herein, either directly (e.g., track shoes 40) or indirectly (e.g., rod 74). Controller 46 may use a control map, lookup table, equation, algorithm, etc., to determine an amount of wear associated with the measured distance.

In some embodiments, controller 46 may determine an amount of wear based on signals from wear sensor(s) 44. In other embodiments, however, controller 46 may forward information received from wear sensor(s) 44 to on-board computer 48 and/or off-board computer 50. On-board computer 48 and/or off-board computer 50 may thereafter determine the amount of wear.

Controller 46, on-board computer 48, and/or off-board computer 50 may selectively generate a message directed to service personnel indicating that track assembly 14 is worn and a corrective action (e.g., track overhaul) is necessary. Upon receiving the message, the service personnel may arrange for the corrective action to take place. For example, the service personnel may take machine 10 out of service until the worn components are replaced. In another example, the service personnel may provide a quote to the owner of machine 10 for replacement parts and service. In addition, the service personnel may schedule replacement of the worn components.

Because the disclosed system may automatically monitor the wear of track assembly components, it may be more likely that machine 10 is serviced at the appropriate time. That is, as soon as it is determined that one or more components of track assembly 14 are worn and should be replaced, the process of servicing machine 10 may immediately begin at the next regular downtime of machine 10. This may help to reduce the likelihood of machine damage caused by operating with worn components and thereby increase machine life. In addition, it may be more likely that the contacted service personnel receive the service contract associated with replacement of the worn components, as the service personnel should be the first entity to provide the service quote to the machine owner.

Further, a monitoring system in accordance with the disclosed embodiments may take one of various configurations that may be suitable for the requirements of a machine configuration and/or a desire of a user. For example, a camera sensor may be used to provide detailed information associated with the wear of multiple components (e.g., the amount of wear at any time, broken down into wear of each component). If, however, a total amount of wear experienced by the track assembly is all that is necessary or desired, a detection sensor or distance sensor may be used to determine a positional shift caused by wear. A detection sensor, on one hand, may provide a low-cost and simple option that provides an indication of whether a threshold amount of wear has occurred. A distance sensor, on the other hand, may also provide a low-cost solution that allows for specific measurement of wear at any time. In some instances, these different types of sensors and wear measurement techniques may be used in combination with each other to provide a more complete picture of wear experienced by a track assembly.

It will be apparent to those skilled in the art that various modifications and variations can be made to the disclosed wear monitoring system. Other embodiments will be apparent to those skilled in the art from consideration of the specification and practice of the disclosed wear monitoring system. It is intended that the specification and examples be considered as exemplary only, with a true scope being indicated by the following claims and their equivalents.

What is claimed is:

1. A track assembly for a mobile machine, comprising:
a chain assembly including a plurality of track links;
a traction assembly including a plurality of track shoes carried by the plurality of track links;
a drive sprocket;
an idler assembly including an idler and a mount;
a roller assembly including a plurality of rollers and a roller frame; and
a wear monitoring system, including:
a detection sensor configured to direct a beam at a location that does not change as a result of wear of components of the track assembly, the detection sensor being configured to generate a first signal indicative of a first position of a first component of the track assembly when a first feature of the first component interrupts the beam, and a second signal indicative of a second position of the first component when the first feature of the first component no longer interrupts the beam, wherein the first component is configured such that wear of at least a second component of the track assembly causes the first component to move to the second position from the first position; and
a controller in communication with the detection sensor, the controller being configured to determine an amount of wear experienced by the track assembly based on the first signal and the second signal.

2. The track assembly of claim 1, wherein the second component is the drive sprocket.

3. The track assembly of claim 1, wherein the second component is the idler.

4. The track assembly of claim 1, wherein the detection sensor is configured to generate the second signal indicative of the beam being directed through a link window in a first track link.

5. The track assembly of claim 4, wherein the detection sensor is configured such that the beam is directed through the link window when the first track link has moved by a threshold amount.

6. The track assembly of claim 1, wherein the wear monitoring system includes a plurality of detection sensors, each detection sensor configured to generate a signal indicating a threshold amount of wear has occurred, each detection sensor configured to generate the signal at a different threshold amount.

7. A method of monitoring wear of a track assembly including a track link, a track shoe, a drive sprocket, an idler, and a roller, the method comprising:
detecting a current position of a first component of the track assembly when a first feature of the first component no longer interrupts a detection sensor beam that does not change position as a result of wear of components of the track assembly, wherein the first component is configured such that the combined amount of wear causes the first component to move to the current position from a previous position, and further wherein the first feature did interrupt the detection sensor beam when an amount of wear of the track assembly was below a threshold; and determining a combined amount of wear of the track link and at least one of the drive sprocket, the idler, and the roller, based on the current position of the first component.

8. The method of claim 7, wherein:
detecting the position of the first component includes directing the detection sensor beam at the track link, and
determining the combined amount of wear includes determining whether the beam was interrupted by the track link or directed through a link window in the track link.

9. A track assembly for a mobile machine, comprising:
a chain assembly including a plurality of track links;
a traction assembly including a plurality of track shoes carried by the plurality of track links;
a drive sprocket;
an idler assembly including an idler and a mount;
a roller assembly including a plurality of rollers and a roller frame; and
a wear monitoring system, including:
at least two detection sensors, each configured to direct a beam at a location that does not change as a result of wear of components of the track assembly, and each detection sensor being configured to generate a first signal indicative of a first position of a component of the track assembly when a first feature of the component interrupts the beam, and a second signal indicative of a second position of the component when the first feature of the component no longer interrupts the beam, wherein the component is configured such that wear of at least another component of the track assembly causes the component to move to the second position from the first position; and
a controller in communication with the at least two detection sensors, the controller being configured to determine an amount of wear experienced by the track assembly based on the first signal and the second signal,
and
wherein each of the at least two wear sensors is one of a camera sensor, a detection sensor, or a distance sensor.

* * * * *